United States Patent Office 2,712,557
Patented July 5, 1955

2,712,557
MANUFACTURE OF UREA

Walter Michelitsch, Ludwigshafen (Rhine) Oppau, and Wilhelm Geisel, Ludwigshafen (Rhine), Germany, assignors to Badische Anilin- & Soda-Fabrik Aktiengesellschaft, Ludwigshafen (Rhine), Germany No Drawing. Application January 24, 1951,
Serial No. 207,654

Claims priority, application Germany February 7, 1950

4 Claims. (Cl. 260—555)

This invention relates to the recovery of solid urea by allowing a urea melt to solidify, and the object of the invention consists in obtaining urea from its melts in a form which is well to handle and stable in storage.

According to the process set forth in the co-pending application Ser. No. 173,481 now matured into U. S. Patent 2,660,604, the crystal form of urea can be considerably influenced by carrying out the crytallization of the urea from aqueous solutions in the presence of small amounts of glyoxal-urea condensation products which have been added to the said solutions. For this purpose acetylene-diurea (glyoxal-diurein) and the condensation products of glyoxal-urea condensation products with formaldehyde, as for example tetramethylol-acetylene-diurea, are well suitable. The substances obtained by heating glyoxal-urea condensation products, such as acetylene-diurea, for example to 250° C., also exert the same action. An example of a useful product is that obtained by heating acetylene-diurea for 2 hours at 250° C.

In the presence of acetylene-diurea or its condensation products with formaldehyde, the urea separates from its aqueous solutions in the form of broad prisms the squattiness of which increases with increase of the amount added. In the presence of the products obtained by heating acetylene-diurea, the urea forms crystals also in the form of broad prisms when a small amount is added, but when larger amounts are added the crystals are in the form of tetrahedra. The amounts which it is necessary to add are very small and in general amount to between 0.05 and 0.3 per cent with reference to the amount of urea dissolved. An addition of more than about 1 per cent is not practicable because the additional substances are difficultly soluble in water or urea solutions.

The coarse crystalline urea obtained according to the said process is better to handle in its separation from the mother liquor and in the drying of the crystal material and it is more stable in storage than crystallized urea obtained in the usual way.

We have now found that an addition of the said substances also offers considerable advantage when the crystallization is carried out in known manner by allowing a urea melt to solidify in particles, for example by spraying the melt with air or by employing other means suitable to divide the melt into particles. The urea melt may be produced by far-reaching evaporation of the water of a urea solution. The urea obtained in this way by dividing the melt into particles consists to a large extent of small balls with smooth surfaces and the remainder consists of particles having less pronounced shape. Urea prepared in the same way, but without the said additional substances, has a considerably smaller content of spherical particles and more readily agglomerates, so that before use it often has first to be comminuted. The urea obtained according to this invention stores much more loosely and, if lumps do form during storage they can readily be broken up by pressure with the hand or with a blow from a shovel.

The following example will further illustrate the present invention but the invention is not limited to this example.

Example

A urea melt containing a few percent of water has added to it a small amount of acetylene-diurea so that there is 0.2 part of acetylene-diurea to 99.8 parts of urea. The melt is sprayed by means of an air current using 15,000 cubic metres of air to 5 cubic metres of urea per hour. The urea so obtained consists to the extent of about 85% of spherical particles and has an excellent capacity for being stored. After storage for 16 weeks, the disruption pressure of the stored mass is 0.7 atmosphere whereas the disruption pressure of a urea prepared in the same way but without the addition of acetylene-diurea is 2.6 atmospheres and the disruption pressure of a urea prepared by crystallization from its aqueous solution, also without additional substances, is 1.7 atmospheres.

What we claim is:

1. A process for the recovery of solid urea in the form of substantially spherical particles which comprises adding to a urea melt from 0.05% to 1.0% by weight with reference to the amount of urea of acetylene-diurea, and spraying the resultant molten product to divide it into particles.

2. A process for the recovery of solid urea in the form of substantially spherical particles which comprises adding to a urea melt from 0.05% to 1.0% by weight with reference to the amount of urea of tetramethylol acetylene-diurea, and spraying the resultant molten product to divide it into particles.

3. A process for the recovery of solid urea in the form of substantially spherical particles which comprises adding to a urea melt from 0.05% to 1.0% by weight with reference to the amount of urea of the product obtained by heating acetylene-diurea at about 250° C. for about 2 hours, and spraying the resultant molten product to divide it into particles.

4. A process for the recovery of solid urea in the form of substantially spherical particles which comprises adding to a urea melt from 0.05% to 1.0% by weight with reference to the amount of urea of a glyoxal-urea condensation product selected from the group consisting of acetylene-diurea, the product obtained by heating acetylene-diurea at about 250° C. for about 2 hours and tetramethylol acetylene-diurea, and spraying the resultant molten product to form said solid urea particles.

References Cited in the file of this patent

UNITED STATES PATENTS

| 2,498,539 | Frejacques | Feb. 21, 1950 |
| 2,574,114 | Lehmann et al. | Nov. 6, 1951 |

FOREIGN PATENTS

| 712,561 | Germany | Sept. 25, 1941 |
| 827,217 | France | Apr. 21, 1938 |

OTHER REFERENCES

Pauly et al., "Ber. deut. Chem." vol. 63 (1930), 2063–69.
"British Plastics and Moulded Products Trader," Aug. 1938, pp. 115–18.
Ritchie, "Chemistry of Plastics and High Polymers" (1949), pp. 115–22.